United States Patent Office 2,840,501
Patented June 24, 1958

2,840,501

AGRONOMICAL PRACTICE FOR THE PROTECTION OF CROPS

Lloyd J. Meuli, Long Beach, Calif., assignor to The Dow Chemical Company, Midland, Mich., a corporation of Delaware No Drawing. Application August 2, 1954
Serial No. 447,374

9 Claims. (Cl. 167—22)

The present invention relates to the protection of crops and is particularly concerned with a new agronomical practice and composition for improving the emergence, seedling growth and harvest of crop plants.

It is an object of the present invention to provide a new and improved agronomical practice for the raising of crops. A further object is to provide a practice which will include the treatment of soil and still permit the immediate utilization of the treated soil for crop purposes. Another object is the provison of a method for protecting the roots of plants against the attack of soil-dwelling fungi. A further object is the provision of a novel composition adapted to be employed in the new practice for raising crops. Other objects will become apparent from the following specification and claims:

The new agronomical practice comprises treating soil or growth media with a sulfonate compound of the formula

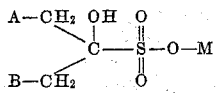

wherein A is bromine or chlorine, B is hydrogen or the halogen represented by A and M is an alkali metal, to benefit crops raised in the treated soil. Such practice protects the crops from the ravages of soil-dwelling fungi which attack their roots and improves crop yields as well as the emergence and growth of seedlings.

The sulfonate compounds are non-flammable, stable, crystalline solids which are somewhat soluble in many organic solvents and water and are adapted readily and conveniently to be distributed in soil or growth media. Further the compounds are non-lachrymatory and of a low order of toxicity to man and higher animals. When distributed in soil the compounds accomplish a rapid kill of soil-dwelling fungi which attacks plant roots. A particularly outstanding advantage of the present invention is that the growth media may be impregnated with the sulfonate compounds in concentrations required for fungal control without adverse effect upon the germination of seeds or the growth of transplants planted in the soil immediately following treatment. This fortunate circumstance obviates the undesirable waiting period between treating and seeding of the soil. It is a further advantage that the compounds permeate the growth media for a short distance from the point of application depending upon the temperature, moisture content, compactness and physical consistency of the media.

The distribution of an effective or fungicidal dosage of the sulfonate compounds in soil or growth media is essential for the practice of the present invention. In general, good results are obtained when the compounds are distributed through the growth media in the amount of from 5 to 50 parts by weight per million parts by weight of the media. Following such treatment, the soil may be immediately seeded or otherwise employed for crop purposes, if desired. In overall field applications, the sulfonate compounds may be applied to and mixed with the soil at a dosage of from about 0.4 pound to 400 pounds or more per acre, and through such a cross-section of the soil as to provide for the presence therein of an effective concentration of the treating agent. In general field applications, it is usually preferred that the compounds be distributed to a depth of at least two inches below the soil surface and at a dosage of at least 1.8 pounds per acre inch of soil. Oftentimes it is desirable to distribute the compounds to a depth of at least 24 inches to avoid reinfestation of the soil from deep-dwelling fungal organisms. In applications to the furrow seed row for the suppression of seedling disease, it is desirable that the compounds be distributed upon the surfaces of the furrow at a dosage of at least 0.15 pound per acre of furrow soil surface. After such treatment, the furrow is seeded and the soil compacted about the seed according to conventional practice. In the row treatment of existing vegetation, the products may be employed with known side-dressing techniques.

In carrying out the method of the present invention, the underground parts of crops are protected against attack by soil-dwelling fungi by distributing in the soil or growth media the unmodified compounds. However, the present method also embraces the employment of a liquid or dust composition containing the compounds. In such usage, the compounds may be modified with one or more of a plurality of additaments or fungicide adjuvants including solvents or other liquid carriers, surface active dispersing agents and finely divided inert solids. Depending upon the concentration of the compounds, such augmented compositions are adapted to be distributed in the soil, or employed as concentrates and subsequently diluted with additional inert carrier to produce the ultimate treating compositions. The required amount of the compounds may be supplied per acre treated in from 5 to 27,000 gallons or more of the liquid carrier or in from about 20 to 2,000 pounds of the solid carrier.

The exact concentration of the compounds to be employed in compositions for the treatment of growth media may vary provided the required dosage of effective agent is supplied. The concentration of toxicant in liquid compositions employed to supply the desired dosage generally is from about 0.001 to 50 percent by weight, although as high a concentration as 90 percent by weight may be employed. In dusts, the concentration of the effective agent may be from about 1 to 20 percent by weight. In compositions to be employed as concentrates, the compounds may be present in a concentration of from about 5 to 95 percent by weight.

Liquid compositions containing the desired amount of effective agent may be prepared by dissolving the toxicant in an organic liquid such as acetone, methylene chloride, chlorobenzene, and petroleum distillates, or by dispersing the toxicant in water with or without the aid of a suitable surface active dispersing agent such as an ionic or nonionic dispersing and emulsifying agent. The preferred organic solvent carriers are those which are adapted to accomplish the penetration and impregnation of the soil with the toxicant compounds, and are of such volatility as to evaporate from the growth media and leave little permanent residue therein. Particularly desirable carriers are the petroleum distillates boiling almost entirely under 400° F. at atmospheric pressure and having a flash point above about 80° F.

The aqueous compositions to be employed in the present method may contain one or more water-immiscible solvents for the compounds. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the effective agent in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the compounds are dispersed in and on a finely divided solid such as talc, chalk, gypsum and the like. In such operations, the finely divided carrier is mixed or wet with the toxicant or a solution thereof in a volatile organic solvent. Similarly, dust compositions containing the compounds may be prepared from various of the solid surface-active dispersing agents such as bentonite, fuller's earth, attapulgite and other clays. Depending upon the proportion of ingredients, these dust compositions may be employed as concentrates and subsequently diluted with additional solid surface-active dispersing agent or with talc, chalk, gypsum and the like to obtain the desired amount of active ingredient in a composition adapted to be distributed in soil. Also such concentrate dust compositions may be dispersed in water, with or without the aid of a dispersing agent, to form aqueous soil treated compositions.

A further embodiment of the present invention is a novel composition comprising growth media or soil in admixture with an effective concentration of the compounds.

When operating in accordance with the present invention, the soil or growth media may be impregnated in any convenient fashion with the sulfonate compounds, i. e. by simple mixing with the growth media, by applying to the surface of soil and thereafter dragging or discing in the soil to the desired depth or by employing a liquid carrier to accomplish the penetration and impregnation. In another method, the compounds are distributed upon the surfaces of the seed furrow and the furrow thereafter planted and compacted about the seed. In general, it is desirable that the distribution be carried out at a soil temperature of 40° F. or higher since the effectiveness of the toxicants may be somewhat reduced at lower temperatures.

In a preferred embodiment, the method of the present invention is carried out in soil having a moisture content of from about 50 to 100 percent of the moisture equivalent of the soil. When operating under such soil conditions, maximum controls of fungal organisms are obtained. Thompson, L. M. in Soils and Soil Fertility, McGraw Book Company, Inc. (1952) defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. The moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In this method, the amount of water may be varied in accordance with the moisture equivalent or field capacity of the soil in order to obtain the desired depth of distribution of the toxicant at a soil moisture content equal to the moisture equivalent. When operating in accordance with such method, toxicant distributions to a depth of from two to four feet or more may be conveniently obtained.

The following examples illustrate the invention but are not to be construed as limiting the same:

*Example 1*

Sodium 1 - bromo-2-hydroxy-2-propanesulfonate and sodium 1,3-dichloro-2-hydroxy-2-propanesulfonate were employed for the treatment of a sandy loam soil heavily infested with the fungus organisms *Fusarium solani*, *Pythium spp.* and *Rhizoctonia solani*. At the time of treatment the soil had a moisture content of 7 percent. This moisture content is about 50 percent of the moisture equivalent or field capacity of the soil. In the treating operations, the soil was placed in sealable vessels and separately injected with an aqueous solution containing 15 grams of one of the sulfonate compounds per liter of ultimate mixture and the vessels sealed. The amounts of aqueous composition employed were sufficient to supply a concentration of 25 parts by weight of one of the sulfonate compounds per million parts by weight of soil. The soil in the sealed vessels was then mechanically mixed to insure uniform distribution of the toxicant composition therein. After 30 minutes of mixing, the soil was removed from the vessels, spread in containers to a depth of about 3.5 inches and seeded with lima beans. In a check operation, the same infested but untreated soil was similarly spread in containers and seeded with lima beans. The containers of seeded soil were then brought to a soil moisture content of about field capacity and thereafter placed in a cold room at 45° F. and 85 percent relative humidity to provide conditions conducive to slow germination of the seed and favorable for rapid infestation of the seed with the complex of root-rot fungi. After one week in the cold room, the containers of seeded soil were removed and thereafter maintained in a greenhouse according to conventional practices with regard to light, temperature, humidity and moisture. During the subsequent growing period there was observed no adverse effect upon germination and seedling growth attributable to the sulfonate compounds.

Five weeks after seeding, the containers were inspected to determine the percentage emergence of seedlings and the plants lifted, roots washed and thereafter examined in order to determine the presence of disease free seedlings. The results are set forth in the following table:

| Treating Compound | Percent Seedling Emergence | Percent Disease Free Seedlings |
|---|---|---|
| Sodium 1-bromo-2-hydroxy-2-propanesulfonate. | 95 | 97 |
| Sodium 1,3-dichloro-2-hydroxy-2-propanesulfonate. | 96 | 99 |
| Checks | zero emergence. | 0 |

*Example 2*

Sodium 1 - bromo-2-hydroxy-2-propanesulfonate was employed for the treatment of a sandy loam soil heavily infested with the fungus organisms *Fusarium solani*, *Pythium spp.* and *Rhizoctonia solani*. At the time of treatment the soil had a moisture content of 7 percent, the latter being about 50 percent of the field capacity of the soil. In the treating operations, the soil was placed in sealable containers and separately injected with an aqueous solution containing 3 grams of the sulfonate compound per liter of ultimate mixture and in an amount sufficient to supply 5 parts by weight of the compound per million parts by weight of soil. The containers were then sealed and the soil therein mechanically mixed to insure uniform distribution of the toxicant composition. After mixing, the containers of treated soil were incubated at an average temperature of 25° C. In a check operation, the above infested but untreated soil was exposed to the same conditions as the treated soil. After three days, the containers were opened and portions of the treated and untreated soil cultured by the dilution plate method as described by J. P. Martin in Soil Science, 69, No. 3, p. 215-32 (March 1950) to determine the percent control of fungal organisms. In the latter operations, the culturing medium employed was a peptone dextrose agar (1000 milliliters of water, 10 grams of dextrose, 5 grams of peptone, 1 gram of $KH_2PO_4$, 0.5 gram of $MgSO_4 \cdot 7H_2O$ and 20 grams of agar) containing 0.069 gram of rose bengal and 0.030 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for 3 days at 25° C.

After incubation, the plates were examined and counts of fungal colonies made in order to determine the percent control of the test organism. The examination showed a 99 percent control of the complex of root-rot fungi.

Example 3

Various sulfonates were employed in a determination as described in Example 2. In such determination, the soil employed was a sandy loam heavily infested with the organisms *Fusarium solani*, *Pythium spp.* and *Rhizoctonia solani*. At the time of treatment, the soil had a moisture content of 7 percent, the latter being about 50 percent of the moisture equivalent of the soil.

The treating, mixing, culturing and incubating operations were all as previously described. The compositions employed in the treating operations were aqueous solutions containing 15 grams of one of the sulfonate compounds per liter of ultimate mixture. These compositions were employed in an amount sufficient to supply 25 parts by weight of one of the toxicants per million parts by weight of the soil.

After three days incubation, the plates were examined and counts of fungal colonies made in order to determine the percent control of the root-rot organisms. The results are set forth in the following table:

| Treating Compound | Percent Control of Root-Rot Fungi |
|---|---|
| Sodium 1-chloro-2-hydroxy-2-propanesulfonate | 98 |
| Sodium 1-bromo-2-hydroxy-2-propanesulfonate | 99 |
| Sodium 1,3-dichloro-2-hydroxy-2-propanesulfonate | 90 |

Example 4

The sandy loam soil as described in Example 3 was treated with various of the toxic sulfonate compounds. In the treating operations the soil was placed in sealable jars and separately injected with aqueous solutions containing 15 grams of one of the sulfonate compounds per liter of ultimate mixture and in amounts sufficient to supply 25 parts by weight of toxicant per million parts by weight of soil. Immediately after treatment, the soil in the containers was seeded to cotton, the containers thereafter sealed and the seeded soil therein mechanically mixed to insure uniform distribution of the sulfonate compositions. In a check operation, the above infested but untreated soil was placed in jars, the soil seeded with cotton seeds and the jars thereafter sealed. Three days after seeding, the check and treated jars were opened, sufficient water added to each jar to encourage germination and seedling growth and the jars immediately resealed. During the subsequent growing period there was observed no adverse effect upon germination and seedling growth attributable to the sulfonate compounds.

Ten days after seeding, the jars were opened, the seedlings removed therefrom and their roots examined in order to determine the number of disease free plants. The results are set forth in the following table:

| Treating Compound | Percent of Disease Free Seedlings |
|---|---|
| Sodium 1-chloro-2-hydroxy-2-propanesulfonate | 100 |
| Sodium 1-bromo-2-hydroxy-2-propanesulfonate | 100 |
| Sodium 1,3-dichloro-2-hydroxy-2-propanesulfonate | 100 |
| Check | (¹) |

¹ All seedlings heavily infested with the complex of root-rot fungi.

Example 5

25 parts by weight of sodium 1-chloro-2-hydroxy-2-propanesulfonate, 70 parts of fuller's earth, 3 parts of an alkyl aryl sulfonate (Nacconol NR) and 2 parts of a polymerized sodium salt of substituted benzoid alkyl sulfonic acid (Daxad No. 27) are mechanically mixed and ground together to prepared a concentrate composition in the form of a wettable powder.

Also, 25 parts by weight potassium 1-bromo-2-hydroxy-2-propanesulfonate, 69 parts of xylene and 6 parts of a diameric alkylated aryl polyether alcohol (Triton X-155) are mechanically mixed together to prepare a liquid emulsifiable concentrate composition.

In a further operation, 94 parts by weight of potassium 1,3-dichloro-2-hydroxy-2-propanesulfonate and 6 parts of a polyoxyethylene sorbitan monolaurate (Tween 20) are mechanically mixed together to prepare a concentrate composition in the form of a dispersible liquid.

These concentrate compositions may be dispersed in water to prepare aqueous compositions which have very desirable wetting and penetrating properties. The latter aqueous compositions are adapted to be employed to treat soil and distribute the sulfonate compounds therein in fungicidal concentration.

Example 6

Sodium 1-bromo-2-hydroxy-2-propanesulfonate and sodium 1,3-dichloro-2-hydroxy-2-propanesulfonate were employed for the treatment of the previously described fungal infested soil. The treating, mixing and seeding operations and subsequent growth conditions were all as set forth in Example 1. The compositions employed in the treating operations were aqueous solutions containing 6 grams of one of the toxicants per liter of ultimate mixture. These compositions were employed in an amount sufficient to supply 10 parts by weight of toxicant per million parts by weight of the soil. During the subsequent growing period, there was observed no adverse effect upon germination and growth of lima bean seedlings attributable to the sulfonate compounds.

Six weeks after planting, the soil plots were inspected to determine the percentage emergence of seedlings and the plants lifted from the soil, their roots washed and thereafter examined in order to determine the presence of disease free seedlings. In addition the plants were weighed and the average weight per seedling determined. The results are set forth in the following table:

| Treating Compound | Percent Seedling Emergence | Percent Disease Free Seedlings | Average Weight per Seedling in Grams |
|---|---|---|---|
| Sodium 1-bromo-2-hydroxy-2-propane-sulfonate | 100 | 84 | 4.3 |
| Sodium 1,3-dichloro-2-hydroxy-2-propane-sulfonate | 98 | 80 | 4.7 |
| Check | 15 | 17 | 1.0 |

Example 7

Sodium 1-bromo-2-hydroxy-2-propanesulfonate was dissolved in water to prepare aqueous compositions containing 0.17 and 0.86 pound of toxicant per 5 gallons of ultimate mixture. These compositions were employed for the treatment of seed beds of sandy loam soil heavily infested with the fungus organisms, *Fusarium solani*, *Pythium spp.* and *Rhizoctonia solani*. At the time of treatment, the soil in the beds had a moisture content equal to about 75 percent of the field capacity. Prior to treatment the beds had been furrowed for seeding with lima beans. In the treating operations, the bottoms and sides of the furrows were sprayed with the compositions at a dosage of 5 gallons of aqueous composition per acre of furrow soil surface. Immediately following the treatments, lima beans were planted in the furrows and the soil compacted about the seeds according to conventional planting practices. In a check operation, seed beds of the same infested but untreated soil were similarly planted with lima beans. During the growing period there was observed no adverse effect upon germination and growth of seedlings attributable to the sulfonate compounds.

Five weeks after planting, the seed beds were inspected to determine the percentage emergence of seedlings and the plants lifted from the soil, roots washed and thereafter examined in order to determine the presence of disease-free seedlings. The results are set forth in the following table.

| Dosage of Sulfonate Compound in Pounds per Acre of Furrowed Soil | Percent Seedling Emergence | Percent Disease Free Seedlings |
|---|---|---|
| 0.17 | 67 | 68 |
| 0.86 | 89 | 72 |
| Check | 1 | 0 |

Example 8

Sodium 1-bromo-2-hydroxy-2-propanesulfonate and sodium 1,3-dichloro-2-hydroxy-2-propanesulfonate were employed for the treatment of the fungal infested soil of Example 1. In the treating operations, the soil was placed in sealable vessels and injected with aqueous solutions containing 3 and 15 grams of one of the sulfonate compounds per liter of ultimate composition and the vessels sealed. The amounts of aqueous composition employed were sufficient to supply 5 and 25 parts by weight, respectively, of toxicant per million parts by weight of soil. The soil in the sealed vessels was then mechanically mixed to insure uniform distribution of the toxicant compositions. After 30 minutes of mixing, the soil was removed from the vessels, spread in flats to a depth of about 3 inches and seeded with sugar beet seed units. In a check operation, the same infested but untreated soil was similarly spread in flats and seeded with sugar beet seed units. The flats of seeded soil were then placed in a lath house where they were exposed to maximum daily temperatures of about 75° F. and watered in an amount adequate for germination and growth. During the growth period there was observed no adverse effect upon germination and growth of seedlings attributable to the sulfonate compounds.

Four weeks after planting, the flats were inspected to determine the number of seedlings emerged from each one hundred planted seed units. The results are set forth in the following table:

| Treating Compound | Concentration of Treating Compound in Soil in Parts by Weight per Million Parts by Weight of Soil | Number of Seedlings Emerging from Each 100 Planted Seed Units |
|---|---|---|
| Sodium 1-bromo-2-hydroxy-2-propane-sulfonate | 5 | 114 |
| | 25 | 135 |
| Sodium 1,3-dichloro-2-hydroxy-2-propane-sulfonate | 5 | 110 |
| | 25 | 122 |
| Checks | 0 | 44 |

Example 9

The dispersible liquid concentrate composition of Example 5 is dispersed in water to prepare a composition containing 100 pounds of potassium 1,3-dibromo-2-hydroxy-2-propanesulfonate per 200 gallons of ultimate mixture. The latter composition while under agitation is metered into irrigation water at the pump outlet at the rate of 4 gallons per 100 gallons of the irrigation water. The water is in a state of turbulent flow as it comes from the pump which provides for the thorough mixing of the toxicant composition therein. About three acre inches of the irrigation water is applied to a sandy loam soil heavily infested with *Fusarium solani*, *Pythium spp.* and *Rhizoctonia solani*. This treatment accomplishes a wetting of the soil to a depth of about two feet to provide a concentration of about 18 parts by weight of the sulfonate compound per million parts by weight of soil. One week following the irrigation, the soil is seeded to lima beans. Four weeks after seeding, the resulting stand of bean plants is examined and found to be substantially free of fungal disease.

The expressions "growth media" or "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Massachusetts. Thus, the terms refer to any substances or media in which vegetation may take root and grow, and are intended to include not only earth but compost, manure, muck, humus, and sand and the like, adapted to support plant growth.

I claim:

1. An agronomical practice which comprises impregnating fungi infected soil with from 5 to 50 parts by weight of a sulfonate compound per million parts by weight of said soil and thereafter planting the treated soil, the sulfonate compound being characterized by the formula

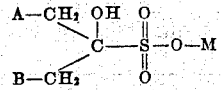

wherein A is a member of the group consisting of bromine and chlorine, B is a member of the group consisting of hydrogen and the halogen represented by A, and M is an alkali metal.

2. In the practice of agricultural economy, the method which comprises impregnating fungi infected soil with a sulfonate compound of the formula

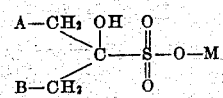

wherein A is a member of the group consisting of bromine and chlorine, B is a member of the group consisting of hydrogen and the halogen represented by A, and M is an alkali metal, the impregnation being carried out to a depth of at least 2 inches below the soil surface and at a relatively uniform dosage of from 5 to 50 parts by weight of the sulfonate compound per million parts by weight of soil.

3. An agronomical practice which comprises applying to and mixing with fungi infected soil a fungicidal amount of a sulfonate compound of the formula

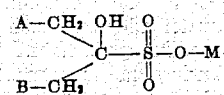

wherein A is a member of the group consisting of bromine and chlorine, B is a member of the group consisting of hydrogen and the halogen represented by A and M is an alkali metal.

4. A fungicidal composition which comprises a sulfonate compound of the formula

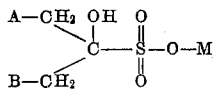

wherein A is a member of the group consisting of bromine and chlorine, B is a member of the group consisting of hydrogen and the halogen represented by A, and M is an alkali metal, in admixture with a fungicide adjuvant as a carrier therefor.

5. A concentrate fungicidal composition which comprises a sulfonate compound of the formula

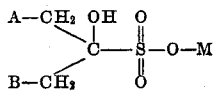

wherein A is a member of the group consisting of bromine and chlorine, B is a member of the group consisting of hydrogen and the halogen represented by A and M is an alkali metal, in admixture with a surface active dispersing agent as a fungicide adjuvant carrier therefor.

6. In the practice of agricultural economy, the method which comprises impregnating fungi infected soil with from 5 to 50 parts by weight of sodium 1-bromo-2-hydroxy-2-propanesulfonate per million parts by weight of the soil.

7. An agronomical practice which comprises impregnating fungi infected soil with from 5 to 50 parts by weight of sodium 1-chloro-2-hydroxy-2-propanesulfonate per million parts by weight of soil.

8. An agronomical practice which comprises impregnating fungi infected soil with from 5 to 50 parts by weight of sodium 1,3-dichloro-2-hydroxy-2-propanesulfonate per million parts by weight of soil.

9. A fungicidal composition which comprises sodium 1-bromo-2-hydroxy-2-propanesulfonate in admixture with a fungicide adjuvant as a carrier therefor.

References Cited in the file of this patent
UNITED STATES PATENTS

| | | |
|---|---|---|
| 2,197,800 | Henke et al. | Apr. 23, 1940 |
| 2,375,868 | Noble | May 15, 1945 |

OTHER REFERENCES

Hackh: Chemical Dictionary, Blakiston, 1944, p. 543.